(12) United States Patent
Turvey

(10) Patent No.: US 6,700,222 B2
(45) Date of Patent: Mar. 2, 2004

(54) POWER TRANSFER SYSTEM

(75) Inventor: Simon Turvey, Birmingham (GB)

(73) Assignee: Lucas Industries Limited (GB)

( * ) Notice: Subject to any disclaimer, the term of this patent is extended or adjusted under 35 U.S.C. 154(b) by 44 days.

(21) Appl. No.: 10/020,072

(22) Filed: Dec. 14, 2001

(65) Prior Publication Data
US 2002/0074863 A1 Jun. 20, 2002

(30) Foreign Application Priority Data
Dec. 20, 2000 (GB) .............................................. 0031057

(51) Int. Cl.⁷ .................................................. H02J 1/00
(52) U.S. Cl. ........................................... 307/87; 307/84
(58) Field of Search ............................. 307/43, 44, 64, 307/77, 78, 84, 87, 112, 113, 116, 124–126, 153, 72, 73, 76, 85, 86

(56) References Cited
U.S. PATENT DOCUMENTS

| | | | | |
|---|---|---|---|---|
| 4,724,331 A | * | 2/1988 | Nordlund | 290/38 R |
| 4,811,163 A | * | 3/1989 | Fletcher | 361/8 |
| 5,386,147 A | * | 1/1995 | Bonneau et al. | 307/64 |
| 5,422,517 A | * | 6/1995 | Verney et al. | 307/29 |
| 5,606,245 A | * | 2/1997 | Kirby | 322/8 |
| 5,654,859 A | * | 8/1997 | Shi | 361/66 |
| 5,729,059 A | * | 3/1998 | Kilroy et al. | 307/84 |
| 5,939,800 A | * | 8/1999 | Artinian et al. | 307/64 |
| 5,977,645 A | * | 11/1999 | Glennon | 290/40 F |

* cited by examiner

Primary Examiner—Gregory J. Toatley, Jr.
Assistant Examiner—Sharon A. Polk
(74) Attorney, Agent, or Firm—David I. Roche; Baker & McKenzie

(57) ABSTRACT

Solid state switching devices, such as power IGBT's, are used to switch a load from one AC generator to another. The switching is controlled to occur only when the phase and voltage of the two generator outputs are within acceptable limited, thus minimizing voltage and current transients.

16 Claims, 3 Drawing Sheets

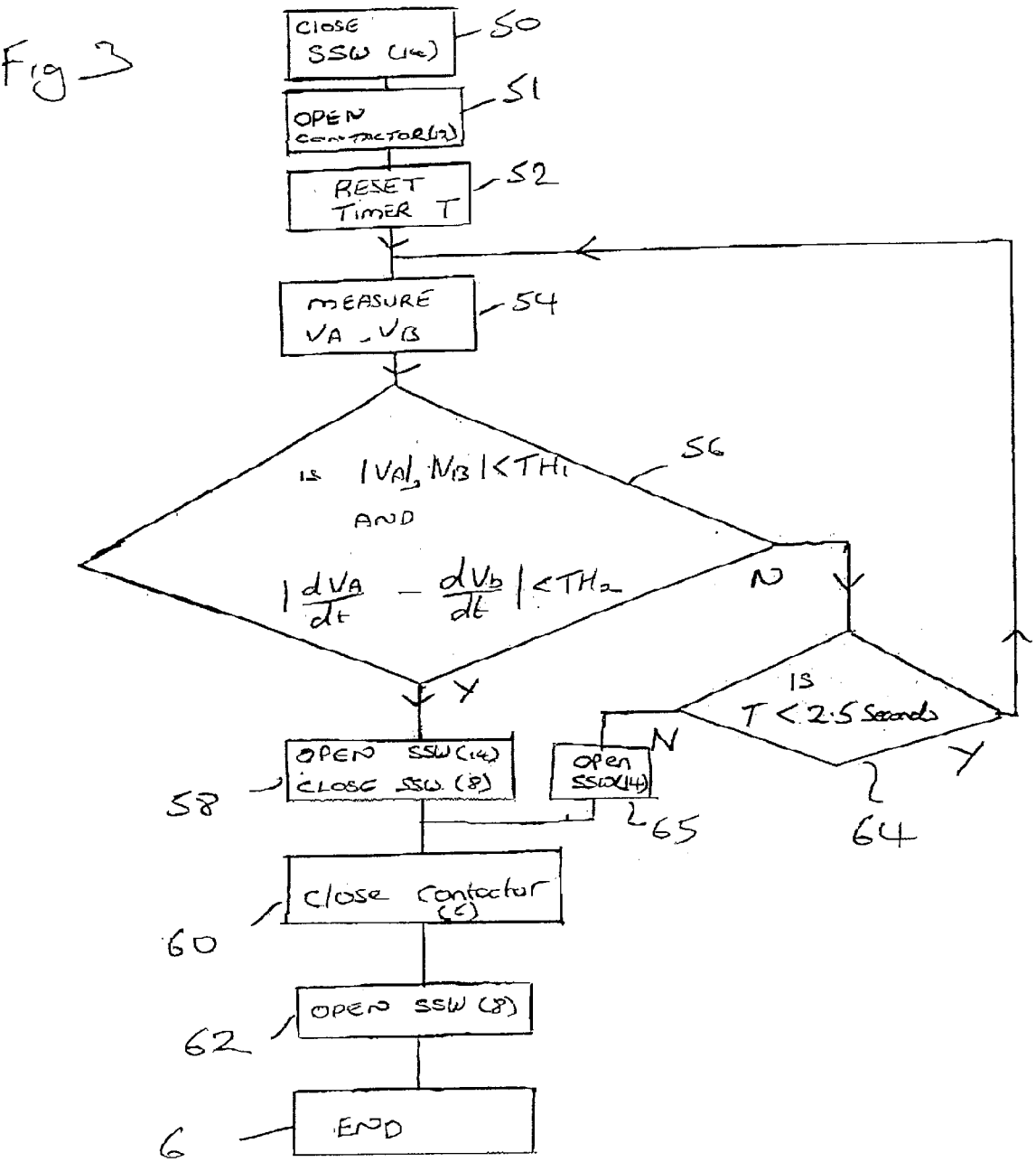

POWER TRANSFER SYSTEM

FIELD OF THE INVENTION

The present invention relates to a power transfer system, and in particular to a no break power transfer system which is suitable for use in aircraft, although it can equally be applied to many other distribution environments.

BACKGROUND TO THE INVENTION

Typically a multi-engined aircraft will have a generator associated with each engine. The generators are driven via a speed control mechanism such that each generator operates at a nominally constant output frequency, generally to provide a 400 Hz electrical supply. However, it will be appreciated that electrically isolated generators will tend to drift both in frequency and phase with respect to one another. However, some aircraft employ variable frequency (VF) generator systems. In these systems the electrical supply frequency varies with engine speed, and is typically between 380 and 780 Hz.

When aircraft is stationary on the ground, its electrical system is often powered from a ground based generator set. Before the aircraft can take off, responsibility for servicing the aircraft's electrical loads needs to be transformed from the ground based generator set to one or more of the aircraft's own generators. This requires switching one or more of the aircraft electrical buses such that they receive power from the aircraft generators. There is also the possibility on a multi-engined aircraft that a generator may need to be switched from one aircraft bus to another aircraft bus during flight. This may, for example, be because of varying "hotol" loads on the electrical system, such as galley or air conditioning loads, or it may be because of the need to respond to some other change in the aircraft's electrical distribution system or generating capacity.

As noted before, the electrically isolated generators will have random phase and frequency differences. This is certainly true in variable frequency systems as individual generators will be working at different speeds. It is also true in a fixed frequency system even though each generator is nominally operating at 400 Hz. As a result, merely connecting a second generator to an aircraft bug already supplied by one generator is not possible as it would result in transient current and voltage fluctuations and shock loads in rotate electrical machines connected to the electrical generating system. In general, aircraft systems are already designed to handle these shock load conditions, but passengers can find it disconcerting when the aircraft lights temporarily extinguish or flicker, One method of transferring power in a variable frequency system is to use a variable frequent intermediate power source, such as an inverter or an auxiliary power unit (APU). This enables the frequency and phase of the intermediate power source to be matched to the aircraft generator for long enough to enable conventional contactors to be used for no-break power transfer. However such systems would be complicated and for in flight use would require the operation of the APU or would incur weight penalty of an inverter unit

SUMMARY OF THE INVENTION

According to a first aspect of the present invention, there is provided a power transfer apparatus for selectively connecting generators to a distribution bus, comprising a controller for monitoring the outputs of first and second generators in order to determine when the outputs of the generators are matched to within a predetermined range, and to operate a connection device to couple the generators together or to switch a load from one generator to the other when their outputs are matched, the connection device comprising at least one solid state device.

Thus, the applicant has realised that in order to avoid voltage transients in the generating system, the outputs of the generators should be monitored, and optionally the generator speeds adjusted, to bring the output waveforms into near conformity.

Preferably the controller monitors the output voltage of at least first and second generators so as to determine the phase difference and voltage difference between their outputs. The power transfer is not performed until their outputs are within a predetermined phase error range of one another. This avoids the possibility of connecting the generators together when one is, for example, at its peek positive voltage value whilst the other is at its peak negative voltage value, or of handing a load from one generator to another when either, has a significant non-zero instantaneous output voltage.

Preferably the power transfer is only performed when the generator output voltages are within a predetermined voltage error range, and most preferably the output of each generator should be near 0 volts. Thus the power/load transfer is only performed when both generator outputs are near 0 volts, and the rate of change of voltage for both generators is either positive (rising) or negative (falling). In this way, voltage and current transients are effectively minimised.

The applicant has realised that, in the context of a 400 Hz aircraft electrical system each complete electrical cycle lasts only 2.5 ms. Furthermore, if switching is restricted to the period only when both voltages are at or about 0 volts, say for example within 5° within the electrical cycle either side of the zero crossing, then each switching window is approximately 70 µs wide. In the context of variable frequency systems the timing requirements for transferring a load from one generator to another can be even more onerous.

Electromechanical power contactors used to switch aircraft systems typically take about 15 ms to close. Thus, if it is desired to perform a no-break power transfer it has hitherto been necessary to adjust the generator speeds to match the frequency and phase of the generators for a period of about 15 ms in order to allow the contactor to operate. This is only realistically possible in constant frequency systems. Once the generators are connected together they become eletrically locked in frequency and phase with each other.

In the context of variable frequency electrical systems it is not possible to match the frequency and phase of the generators. It is also not advisable to connect the generators together as they will form a mismatched motor-generator pair and large currents will be caused to flow.

It has hitherto been necessary in variable frequency systems to isolate the load from one generator before connecting it to another generator. Thus, the load is temporarily deprived of power. This may be noticed by passengers observing the cabin lights extinguishing and returning. This may lead to undesirable levels of anxiety amongst passengers.

The applicant has realised that solid state devices can be used to switch the generators into electrical connection with each other or to perform a break before make bus hand over during the relatively short switching window. Additionally, if the solid state switch is in parallel with an electromechanical contactor, then the solid state switch is effectively only required to bear the full generator output for the 15 ms or so that it takes for the contactor to close.

Preferably the solid state switch comprises one or more transistors, such as power IGBTs, MOSFETs, thyristors or triacs. In the case of MOSFETs, IGBTs or thyristors, one or more MOSFETs, IGBTs or thyristors is provided for the alternative half cycle of the voltage waveforms as these are effectively mono directional devices.

Preferably the electromechanical contactor and the or each semiconductor device have independent control lines such that the mechanical and semiconductor switches can be independently controlled. Thus, for generator shutdown or hand-over, the mechanical contactor can be opened before the associated semiconductor switch is opened, thereby assuring that generator hand-off also occurs at the zero crossing point in the generator's generating cycle.

Although it is desirable that the power switching should be transferred in a seamless or no break manner, clearly it is also important that the power transfer should be deterministic, in that it must be assured that the operation is completed within a set time period. Thus, advantageously, upon a power transfer request being sent to the controller, a timer is initiated and if the power transfer has not been performed within a maximum time period, then the electromechanical contactors are operated in order to switch the load from one generator to another with voltage or current transients being accepted as a consequence of this action.

In order to achieve a no-break power transfer of a load from one generator to another, especially in variable frequency systems, it is desirable that the transfer is performed rapidly.

Preferably a first generator is disconnected from the load momentarily before the second generator is connected. Because the hand-over occurs around the zero volt point in the power curve the hand-over is effectively "seamless". In order to achieve this the electromechanical contactor of a first generator may advantageously be opened just prior to the transfer of the load from the first generator to a second generator. In order to implement this it is preferable that convergence or near convergence of the generator wave forms can be identified in advance, although it follows that the prediction of convergence needs only to be made in advance of convergence by a period corresponding to the contactor's switching time, say 10 to 15 ms and/or that of the semiconductor switch which may be a number of microseconds.

According to a second aspect of the present invention there is provided a method of selectively connecting generators to a distribution bus, comprising the steps of monitoring the outputs of first and second generators in order to determine when the outputs are matched to within a predetermined range, and operating a connecting device comprising at least one solid state switch to couple the generators together or to switch a load from one generator to the other via the at least one solid state switch when their outputs are matched.

According to a third aspect of the present invention, there is provided a method of connecting a first AC generator to a bus which is already connected to an AC generator, comprising the step of operating a solid state switching device to connect first generator to the bus Preferably the generator already connected to the bus is disconnected from the bus momentarily before the first AC generator is connected to the bus.

Preferably the solid state switching device is in parallel with a mechanical or electromechanical contactor which is closed soon after the solid state device has been operated, thereby reducing the power handling requirements of the solid state device

BRIEF DESCRIPTION OF THE DRAWINGS

The present invention will further be described, by way of example, with reference to the accompanying drawings in which:

FIG. 3 illustrates a power transfer algorithm constituting an embodiment of the present invention.

DETAILED DESCRIPTION OF AN EMBODIMENT OF THE INVENTION

Figure 1:
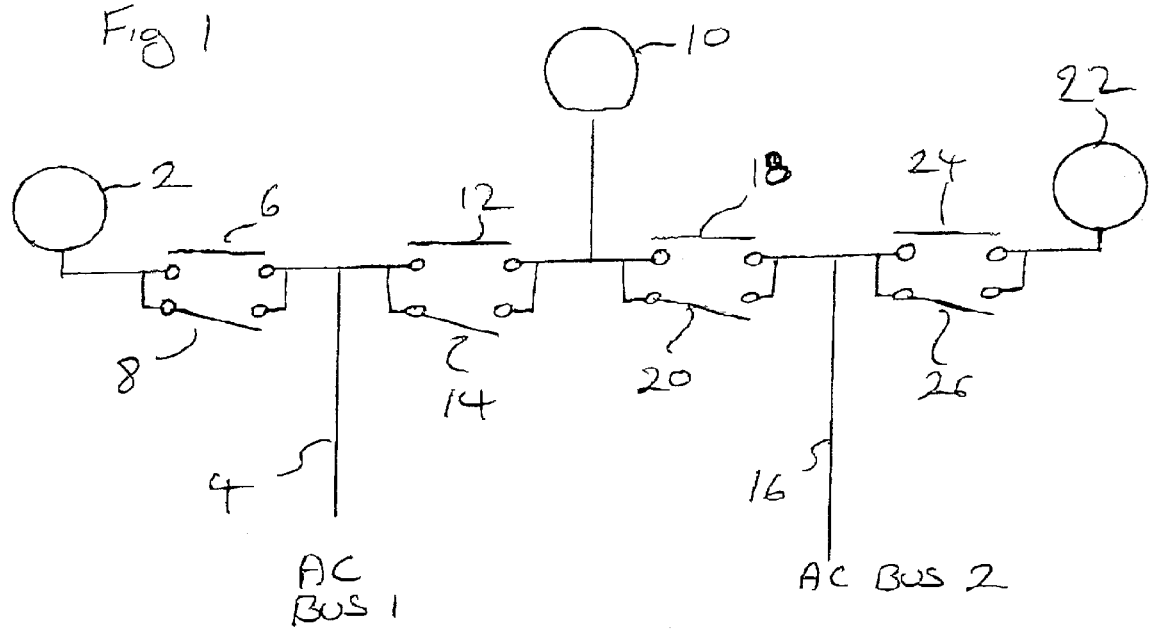
FIG. 1 schematically illustrates the electrical system of an aircraft having two generators and two AC buses.

FIG. 1 schematically illustrates electrical bus of an aircraft having a power transfer system constituting an embodiment of the present invention. The system comprises a first generator 2 which can be connected to or disconnected from a first aircraft bus 4 via an electromechanical contactor 6 and a solid state switch 8. An auxiliary power unit 10 or ground based unit can be connected to the first aircraft bus 4 via a second electromechanical contactor 12 and a second solid state switch 14. Furthermore, the generator 10 can be connected to a second aircraft bus 16 via a third electromechanical contactor 18 and a third solid state switch 20. A second main generator 22 can be connected to the second aircraft bus 16 via a fourth electromechanical contactor 24 and a fourth solid state switch 26. The first solid state switch 8 is in parallel with the first electromechanical contactor 6, second solid state switch 14 is in parallel with the second electromechanical contactor 12, and so on.

Figure 2:
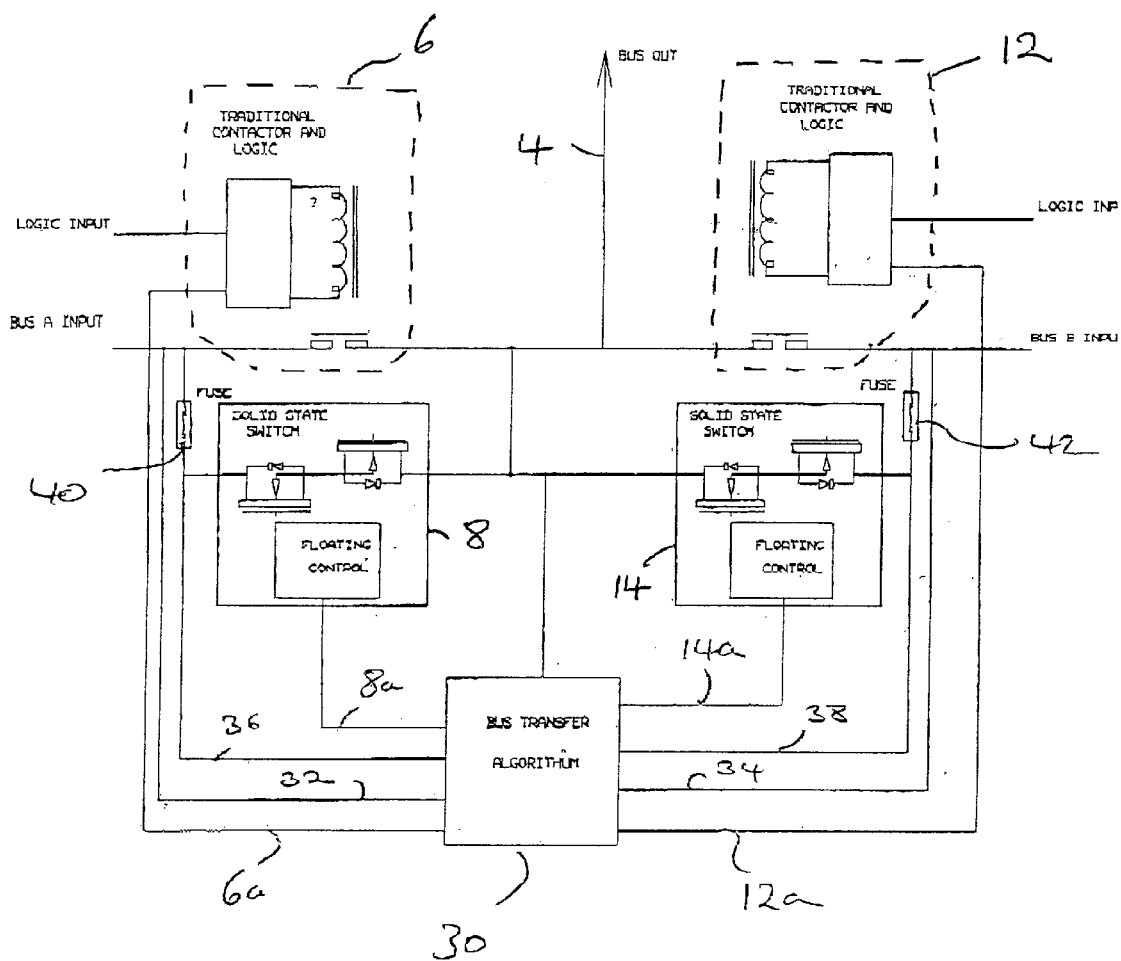
FIG. 2 schematically illustrates a switching apparatus constituting an embodiment of the present invention.

The circuitry associated with the switches 6, 8, 12 and 14 is shown in greater detail in FIG. 2. The arrangement shown in FIG. 2 can be notionally considered as having two input buses, bus A which connects to the first generator 2, and bus B which can receive power from the auxiliary power unit 10, or could indirectly receive power from the second generator 22. Each electromechanical contactor 6 and 12 has a control line 6a and 12a connected to a power transfer controller 30. The controller 30 also has control lines 8a and 14a connected to the solid state switches 8 and 14 respectively. The controller also has voltage monitoring lines 32 and 34 connected to bus A and bus B, respectively, in order to monitor the voltage thereon and solid state switch monitoring lines 36 and 38 which connect to the node formed between each solid state switch 8 and 14, and an associated fuse 40 and 42, thereby enabling the controller 30 to chock whether or not the fuses 40 and 42 have blown.

As shown in the diagram, the solid state switches 8 and 14 comprise back-to-back insulated gate bi-polar transistors (IGBTs) each receiving an input signal from a floating control unit incorporated within the solid state switch modules.

Suppose, for example that the aircraft is on the runway with power being supplied from the auxiliary power unit 10 to the first aircraft bus, designated 4 in FIG. 1. The first generator 2 is disconnected from the first aircraft bus 4, but it is desired to transfer the load on the first aircraft bus 4 to the first generator 2.

Initially, the first contactor 6 and the first solid state switch 8 are open thereby leaving the first generator 2 isolated, and the second contactor 12 is closed and second solid state switch (SSW) 14 is open.

The power transfer controller 30 implements a power transfer algorithm which is illustrated in FIG. 3. Control commences at step 50 where the second solid state switch 14 is closed. Control then passes to step 51 where electromechanical connector 12 is opened (de-energised). Control is then passed to step 52 where a timer is resets, so that a measure of time T elapsed since the power transfer request was initiated is available. From step 52, control passes to step 54 where a measurement is made of the voltages $V_A$ and $V_B$ occurring on bus A and bus B, respectively. From here, control is passed to step 56 where a test is made to see whether the generator outputs are matched to within acceptable parameters. The test is essentially a two part test. Firstly, the magnitudes of $V_A$ and $V_B$ are compared with the threshold TH1, If both the magnitude $V_A$ and the magnitude $V_B$ is less than the threshold TH1, which is set to a voltage close to zero, then it can be assumed that both generator outputs are near or at zero volts. A second part of the test is to require that the generators are approximately in-phase. For this, the magnitude of $dV_A/dt - dV_B/dt$ can be compared with a second threshold TH2. TH2 is also set close to zero. If both these tests are passed then control is passed to step 58 which causes the second solid state switch 14 to be opened and first solid state switch 8 to be closed. Control then passes to step 60 wherein the first electromechanical contactor 6 is closed. Control is then passed to step 62 where solid state switch 8 is opened and then to stop 68 which represents the end of the connection algorithm. However, returning to step $56_2$ if the generator voltages are not sufficiently matched, control is passed to step 64 where a test is made of the elapsed time T since the algorithm was started. If T is less than the maximum power transfer time allowed, which is 2.5 seconds in this example, then control is returned to step 54. However, once T reaches or exceeds 2.5 seconds, control is then passed firstly to step 65 where the second solid state switch 14 is opened and then to step 60 to cause electromechanical contactor to close thereby connecting the load to the first generator 2.

Similar connection routines can be employed for transferring responsibility for powering the second aircraft bus 16 from either the second generator 22 or the auxiliary power unit 10, or even for powering the first aircraft bus 4 from the second generator 22 or the second aircraft bus 16 from the first generator 2.

It is thus possible to provide a no-break poser transfer by utilising the extremely rapid switching available from semiconductor devices, whilst operating these semiconductor devices in parallel with electromechanical contactors such that, in normal use, the majority of current flow is for the majority of the time, via the electromechanical contactor. Once an electromechanical contactor is closed its associated solid state device may be switched to the (non-conductive) state in order to further reduce power dissipation within the device. The working life of the electromechanical contactors is improved by ensuring that they are opened before the parallel solid state switch is opened.

What is claimed is:

1. A power transfer apparatus for selectively connecting first and second variable frequency generators to a distribution bus, the apparatus comprising a controller and first and second connection devices, each comprising an electromechanical contactor in parallel with an associated solid state switch, in which in response to a change over request to change from the first to the second generator the controller is arranged to monitor the respective outputs of the first and second generators in order to determine when the outputs are matched to within a predetermined range, and to operate the connection devices to switch the distribution bus from one generator to the other when their outputs are matched, such that during changeover current flow occurs via the solid state switches with the first generator being disconnected before the second generator is connected and wherein the closing of the solid state switch associated with the second generator is performed immediately after the solid state switch associated with the first generator has opened.

2. A power transfer apparatus according to claim 1, in which the controller is arranged to monitor the output voltage of the first and second generators to determine the phase and voltage difference between the respective generator outputs.

3. A power transfer apparatus according to claim 2, in which at least one of the connection devices is operated when the phase difference is within a predetermined range.

4. A power transfer apparatus according to claim 3, in which at least one of the connection devices is operated when the rate of change of voltage of both of the generators is either positive or negative.

5. A power transfer apparatus according to claim 2, in which at least one of the connection devices is operated when the voltage difference between the generator outputs is within a predetermined range.

6. A power transfer apparatus according to claim 5, in which at least one of the connection devices is operated when the voltages at the outputs of the first and second generators are substantially zero.

7. A power transfer apparatus according to claim 1, in which at least one of said electromechanical contactors and its respective solid state device have respective independent control lines coupled to said controller.

8. A power transfer apparatus according to claim 1, in which the apparatus further comprises a timer arranged to operate said electromechanical contactors after a predetermined time period has elapsed following the commencement of a transfer request.

9. A power transfer apparatus according to claim 1, in which the solid state device comprises at least one power IGBT, MOSFET, thyristor or triac.

10. A power transfer apparatus as claimed in claim 1, in which when the transfer apparatus is connecting a generator to the distribution bus, at least one of the contactors is closed shortly after the solid state device is made conducting.

11. A power transfer apparatus as claimed in claim 1, in which when the transfer apparatus is disconnecting a generator from the distribution bus, the semiconductor device is made conducting, the associated contactor is opened and then the semiconductor device is made non conducting.

12. A method of selectively removing a first generator from connection to a distribution bus and connecting a second generator to the distribution bus, comprising the steps of monitoring outputs of first and second generators in response to a change over request in order to determine when the outputs are matched to within a predetermined range, and operating first and second connecting devices each comprising at least one solid state switch in parallel with an electromechanical actuator or to switch the distribution bus from one generator to the other via the at least one solid state switch when their outputs are substantially matched, wherein during changeover current flow occurs solely via the solid state switches and the first generator is disconnected from the distribution bus before the second generator is connected and wherein the closing of the solid state switch associated with the second generator is performed immediately after the solid state switch associated with the first generator has opened.

13. A method as claimed in claim 12, in which when connecting a generator to the distribution bus the solid state switch in series with the generator and the distribution bus is made conducting, and then the contactor in parallel with the solid state switch is closed.

14. A method as claimed in claim 12, in which when disconnecting a generator from the distribution bus the solid state switch in series with the generator and the bus is made conductive, the contactor in parallel with the solid state switch is switched from closed to open, and then the solid state switch is made non conductive.

15. A method as claimed in claim 12, in which a the solid state switch is operated to connect the generator to the bus, or to disconnect it therefrom when the outputs of the generators are matched in amplitude and phase to within predetermined thresholds.

16. The method according to claim 12, in which the method further comprises operating an electromechanical contractor after a predetermined period of time has elapsed.

* * * * *